(12) United States Patent
Barr et al.

(10) Patent No.: US 10,341,693 B2
(45) Date of Patent: Jul. 2, 2019

(54) PRE-EMPTIVE CONTENT CACHING IN MOBILE NETWORKS

(75) Inventors: Arthur J. Barr, Swindon (GB); Ian O. Partridge, Chandlers Ford (GB); Adam J. Pilkington, Eastleigh (GB); David S. Renshaw, Winchester (GB); Andrew Taylor, Winchester (GB); Thomas Van Der Veen, Chandlers Ford (GB)

(73) Assignee: International Business Machines Corporation, Armonk, NY (US)

( * ) Notice: Subject to any disclaimer, the term of this patent is extended or adjusted under 35 U.S.C. 154(b) by 186 days.

(21) Appl. No.: 14/348,979

(22) PCT Filed: Sep. 7, 2012

(86) PCT No.: PCT/EP2012/067509
§ 371 (c)(1),
(2), (4) Date: Apr. 1, 2014

(87) PCT Pub. No.: WO2013/050216
PCT Pub. Date: Apr. 11, 2013

(65) Prior Publication Data
US 2014/0250468 A1    Sep. 4, 2014

(30) Foreign Application Priority Data
Oct. 4, 2011 (EP) .................................... 11183790

(51) Int. Cl.
*H04W 4/06* (2009.01)
*H04N 21/231* (2011.01)
(Continued)

(52) U.S. Cl.
CPC ... *H04N 21/23106* (2013.01); *H04L 65/4069* (2013.01); *H04L 65/80* (2013.01);
(Continued)

(58) Field of Classification Search
CPC .......... H04N 21/231; H04N 21/23103; H04N 21/23106; H04W 4/02; H04W 4/025;
(Continued)

(56) References Cited

U.S. PATENT DOCUMENTS 6,910,079 B2 * 6/2005 Zimmermann ... H04L 29/06027
709/232
7,085,576 B2 8/2006 Ranganathan
(Continued)

FOREIGN PATENT DOCUMENTS

CN   1753554 A   3/2006
CN   1852568 A   10/2006
(Continued)

OTHER PUBLICATIONS

International Searching Authority, International Search Report and Written Opinion for International Application No. PCT/EP2012/067509, dated Oct. 19, 2012.
(Continued)

*Primary Examiner* — James R Sheleheda
(74) *Attorney, Agent, or Firm* — Law Office of Jim Boice

(57) ABSTRACT

A method manages substantially continuous delivery of a data stream to a mobile communications device through sequential access thereby to respective receivers from a networked arrangement of wireless transceivers at known locations. A current location and velocity of the mobile communications device is determined. Based on a determined current location and velocity of the mobile communications device, a prediction for a next wireless transceiver to be accessed is generated, and a portion of the data stream is pre-cached at a predicted next wireless transceiver.

18 Claims, 5 Drawing Sheets

(51) Int. Cl.

| | | |
|---|---|---|
| *H04W 36/02* | (2009.01) | |
| *H04N 21/433* | (2011.01) | |
| *H04W 36/32* | (2009.01) | |
| *H04W 40/02* | (2009.01) | |
| *H04W 64/00* | (2009.01) | |
| *H04W 4/029* | (2018.01) | |
| *H04L 29/08* | (2006.01) | |
| *H04W 4/02* | (2018.01) | |
| *H04W 36/00* | (2009.01) | |
| *H04L 29/06* | (2006.01) | |

(52) U.S. Cl.
CPC ..... *H04L 67/2847* (2013.01); *H04N 21/4331* (2013.01); *H04W 4/027* (2013.01); *H04W 4/029* (2018.02); *H04W 4/06* (2013.01); *H04W 36/0016* (2013.01); *H04W 36/32* (2013.01); *H04W 40/026* (2013.01); *H04L 67/289* (2013.01); *H04W 36/023* (2013.01); *H04W 64/006* (2013.01)

(58) Field of Classification Search
CPC ......... H04W 4/027; H04W 4/06; H04W 4/18; H04W 8/08; H04W 8/14; H04W 36/0005; H04W 36/0016; H04W 36/0011
See application file for complete search history.

(56) References Cited

U.S. PATENT DOCUMENTS

| | | | |
|---|---|---|---|
| 7,222,169 B2 | 5/2007 | Koshimizu et al. | |
| 7,397,779 B2 | 7/2008 | Chandra et al. | |
| 7,519,470 B2 | 4/2009 | Brasche et al. | |
| 7,562,393 B2 | 7/2009 | Buddhikot et al. | |
| 7,581,019 B1 * | 8/2009 | Amir | H04L 47/10 370/235 |
| 7,657,268 B2 | 2/2010 | Oswal et al. | |
| 7,657,672 B2 * | 2/2010 | Kampmann | H04L 29/06027 710/310 |
| 7,831,265 B1 * | 11/2010 | Shen | H04W 28/24 455/420 |
| 7,895,629 B1 * | 2/2011 | Shen | H04N 7/18 710/52 |
| 8,134,970 B2 * | 3/2012 | Jalil | H04W 36/02 370/331 |
| 8,218,439 B2 * | 7/2012 | Deshpande | H04L 29/06027 370/230.1 |
| 8,239,911 B1 * | 8/2012 | Sun | H04N 21/2187 725/118 |
| 8,483,710 B2 * | 7/2013 | Casey | H04L 67/04 340/988 |
| 8,718,670 B2 * | 5/2014 | Ringland | H04W 28/00 455/446 |
| 8,718,797 B1 * | 5/2014 | Addepalli | H04W 4/046 700/17 |
| 8,861,932 B2 * | 10/2014 | Shaw | H04N 21/2221 386/239 |
| 8,897,790 B2 | 11/2014 | Hamalainen et al. | |
| 8,909,807 B2 * | 12/2014 | Harrang | H04L 1/0002 709/232 |
| 8,948,779 B1 * | 2/2015 | Choi | H04L 67/303 455/456.1 |
| 9,125,032 B2 * | 9/2015 | Burckart | H04W 8/14 |
| 9,800,948 B2 * | 10/2017 | Ma | H04N 21/23430 |
| 9,820,009 B2 * | 11/2017 | Lohmar | H04N 21/6408 |
| 2003/0007515 A1 * | 1/2003 | Apostolopoulos | H04L 29/06 370/503 |
| 2003/0065712 A1 * | 4/2003 | Cheung | H04L 29/06 709/203 |
| 2004/0143386 A1 | 7/2004 | Yoshihara et al. | |
| 2004/0192342 A1 * | 9/2004 | Ranganathan | H04L 65/4092 455/456.1 |
| 2004/0203779 A1 * | 10/2004 | Gabara | H04W 36/32 455/436 |
| 2004/0255331 A1 * | 12/2004 | Inoue | H04L 1/1607 725/118 |
| 2006/0079234 A1 | 4/2006 | Ishikawa | |
| 2006/0227744 A1 | 10/2006 | Metke et al. | |
| 2006/0286988 A1 * | 12/2006 | Blume | G01C 21/3679 455/456.1 |
| 2007/0053446 A1 * | 3/2007 | Spilo | H04L 1/0003 375/259 |
| 2007/0094461 A1 | 4/2007 | Nguyen et al. | |
| 2007/0094691 A1 * | 4/2007 | Gazdzinski | H04N 7/17318 725/62 |
| 2007/0133405 A1 * | 6/2007 | Bowra | H04L 43/00 370/230 |
| 2008/0085724 A1 * | 4/2008 | Cormier | H04W 4/02 455/456.1 |
| 2008/0151817 A1 | 6/2008 | Fitchett et al. | |
| 2008/0310365 A1 * | 12/2008 | Ergen | H04W 36/02 370/331 |
| 2009/0006308 A1 | 1/2009 | Fonsen | |
| 2009/0073946 A1 | 3/2009 | Morita | |
| 2009/0089445 A1 * | 4/2009 | Deshpande | G06F 15/16 709/231 |
| 2009/0094649 A1 * | 4/2009 | Patel | G08B 13/19641 725/86 |
| 2009/0100188 A1 * | 4/2009 | Li | H04N 21/23106 709/231 |
| 2009/0156210 A1 | 6/2009 | Ponce De Leon et al. | |
| 2009/0275346 A1 * | 11/2009 | Bauman | H04W 36/02 455/456.2 |
| 2009/0319177 A1 | 12/2009 | Khosravy et al. | |
| 2010/0003008 A1 * | 1/2010 | Thomas | H04N 5/783 386/344 |
| 2010/0034167 A1 | 2/2010 | Umesh et al. | |
| 2010/0085947 A1 * | 4/2010 | Ringland | H04W 28/00 370/338 |
| 2010/0131584 A1 | 5/2010 | Johnson | |
| 2010/0299055 A1 * | 11/2010 | Hilbrandie | G01C 21/32 701/532 |
| 2011/0131618 A1 * | 6/2011 | Hasek | H04N 7/17336 725/89 |
| 2011/0136488 A1 * | 6/2011 | Kuvvali | H04W 36/08 455/436 |
| 2011/0172018 A1 | 7/2011 | Premutico | |
| 2011/0283333 A1 * | 11/2011 | Ukkadam | H04L 63/102 725/131 |
| 2011/0310866 A1 * | 12/2011 | Kennedy | H04W 16/14 370/338 |
| 2012/0011265 A1 * | 1/2012 | Curcio | H04N 21/2402 709/231 |
| 2012/0102140 A1 * | 4/2012 | Nadas | H04L 43/0888 709/213 |
| 2012/0159555 A1 * | 6/2012 | Minwalla | H04N 21/6131 725/62 |
| 2012/0164979 A1 * | 6/2012 | Bachmann | H04L 63/164 455/411 |
| 2012/0179801 A1 | 7/2012 | Luna et al. | |
| 2012/0182935 A1 * | 7/2012 | Addepalli | H04W 4/02 370/328 |
| 2012/0263434 A1 * | 10/2012 | Wainner | H04N 5/765 386/241 |
| 2012/0300747 A1 * | 11/2012 | Westberg | H04W 36/0011 370/331 |
| 2013/0007860 A1 * | 1/2013 | Burckart | H04N 21/222 726/7 |
| 2013/0018574 A1 * | 1/2013 | Adler | G01C 21/3492 701/408 |
| 2013/0031204 A1 * | 1/2013 | Graham | G06F 17/30899 709/217 |
| 2013/0111052 A1 * | 5/2013 | Albal | H04N 21/23439 709/231 |
| 2013/0185452 A1 * | 7/2013 | Burckart | H04L 65/4084 709/231 |
| 2013/0244711 A1 | 9/2013 | Burckart et al. | |

(56) References Cited

U.S. PATENT DOCUMENTS

| | | | | |
|---|---|---|---|---|
| 2013/0301584 | A1* | 11/2013 | Addepalli | H04W 4/046 370/329 |
| 2013/0332559 | A1* | 12/2013 | Mas Ivars | H04L 61/1511 709/216 |
| 2014/0155043 | A1* | 6/2014 | Gell | H04L 67/02 455/414.1 |
| 2014/0250468 | A1* | 9/2014 | Barr | H04W 36/32 725/62 |
| 2015/0020140 | A1* | 1/2015 | Takaki | H04H 60/42 725/116 |
| 2015/0131657 | A1* | 5/2015 | Oyman | H04W 56/00 370/390 |
| 2015/0146611 | A1* | 5/2015 | Joshi | H04W 28/0231 370/328 |
| 2015/0256581 | A1* | 9/2015 | Kolhi | H04L 65/602 709/219 |
| 2016/0044129 | A1* | 2/2016 | Bergmann | H04L 67/2847 455/406 |
| 2016/0072911 | A1* | 3/2016 | Velummylum | H04W 4/025 709/224 |
| 2017/0330100 | A1* | 11/2017 | Bevan | G06N 7/005 |

FOREIGN PATENT DOCUMENTS

| | | |
|---|---|---|
| DE | 10025725 A1 | 12/2001 |
| EP | 1737160 A1 | 12/2006 |
| EP | 1968243 A1 | 9/2008 |
| WO | 2004062122 A2 | 7/2004 |

OTHER PUBLICATIONS

T. Wu, et al., "Efficient Mobile Content Delivery by Exploiting User Interest Correlation", IEEE International Conference on Multimedia and Expo, 2004, vol. 2, pp. 1-2.

G. Cho, "Using Predictive Prefetching to Improve Location Awareness of Mobile Information Service", Proceedings of the International Conference on Computational Science—Part III, Springer-Verlag, London, UK, 2002 (Abstract Only).

J. Jing, "Client Server Computing in Mobile Environments", ACM Computing Surveys, vol. 31, No. 2, Jun. 1999, pp. 121-123, ACM.

M. Chelliah et al., "A Novel Distance Based Relocation Mechanism to Enhance the Performance of Proxy Cache in a Cellular Network", The International Arab Journal of Information Technology, vol. 6, No. 3, Jul. 2009, pp. 258-263.

J. Lee et al., "Advanced Semisoft Handoff Method of Cellular IP Access Networks", Proceedings of the 18th International Conference on Advanced Information Networking and Applications, vol. 2, 2004, pp. 407, IEEE Computer Society, Washington, DC, US. (Abstract Only).

K. Curran, "Minimizing the Handoff Latency in Ad-Hoc Networks When Streaming Media to Mobile Devices", International Journal of Wireless Information Networks, vol. 8, No. 3, Jul. 2001, pp. 177-187, Kluwer Academic Publishers-Plenum Publishers. (Abstract Only).

\* cited by examiner

PRE-EMPTIVE CONTENT CACHING IN MOBILE NETWORKS

BACKGROUND

The present invention relates generally to the field of audio and/or video (hereinafter "AV") data stream delivery over wireless communication networks, and in particular, although not exclusively, to the delivery of time-critical streams to mobile communications devices.

Recent years have seen a huge increase in the form and function of mobile communications-enabled devices, coupled with an even greater increase in the volume of AV content available for access (whether downloaded and stored or watched/listened to "live"). A particular problem area relates to accessing content using a mobile data network, such as a 3G network accessed from a Smartphone or laptop. If a subscriber is moving while streaming content, or downloading a large file, then the network must manage the subscriber's transition between cells of the network.

One approach to managing the transition is directed to a method and system for reducing service interruptions to mobile communication devices. In the system described, context information (in the form of location and speed/direction data) associated with a wireless mobile device is used to determine a potential occurrence of a network disruption, for example a railway tunnel or the boundary between two networks. Upon determining a potential occurrence of a network disruption, the system makes a prediction as to the future data that may be desired by the mobile device and then causes an increase in the bandwidth available for data transfer to the mobile device, such that the predicted future data is pre-emptively transferred to the mobile device. The increase in bandwidth available for data transfer is intended to allow sufficient data content to be pre-cached by a memory cache controller of the mobile device so as to provide continual data content to the user during a network disruption. A further example of pre-emptive caching within a mobile device based on a predicted location of that mobile device.

A problem with the above approach is that firstly it just addresses potential breaks or delays in the transmission of the data stream from network to mobile user, and does not deal with the delays that can arise when an ongoing request for a continuous data stream delivery is transferred from one network to another, or even between transmission sources on the same network. Secondly, it requires a relatively large amount of local memory space to be kept free within the mobile device to receive and cache the temporary data.

It is therefore an object of the present invention to provide a means to minimise delays in the supply of streaming content to a user moving through a series of content delivery sources.

SUMMARY

In one embodiment of the present invention, a method and/or computer program product manages substantially continuous delivery of a data stream to a mobile communications device through sequential access thereby to respective receivers from a networked arrangement of wireless transceivers at known locations. A current location and velocity of the mobile communications device is determined. Based on a determined current location and velocity of the mobile communications device, a prediction for a next wireless transceiver to be accessed is generated, and a portion of the data stream is pre-cached at a predicted next wireless transceiver.

In one embodiment of the present invention, a communications apparatus comprises: a mobile communications device; a data source providing a sequential data stream; a plurality of network linked wireless transceivers coupled with the data source, each transceiver being at a known location, each transceiver being operable to transmit data to and receive data from the mobile communications device, and each transceiver having an associated data store operable to store data from said data source; a prediction generator configured to determine a current location and velocity for the mobile communications device and, based thereon, generate a prediction for the next wireless transceiver to be accessed; and a download co-ordinator coupled with the prediction generator and transceivers and arranged to initiate pre-caching of a portion of the data stream at the predicted next wireless transceiver.

BRIEF DESCRIPTION OF THE SEVERAL VIEWS OF THE DRAWINGS

The present invention will now be described, by way of example only, with reference to preferred embodiments, as illustrated in the following figures, in which.

DETAILED DESCRIPTION

The following exemplary embodiments describe an improvement to caching at the edge of mobile data networks. The embodiments make use of information that is readily accessible within a mobile network to improve end user experience, by pre-emptively caching (pre-caching) content at edge servers which are predicted to be used by a subscriber (user). For example, consider a subscriber who boards a train from London to Edinburgh, and starts watching a movie, streamed across a mobile network. During the journey, the subscriber's access to the mobile network will pass through dozens of cells, and each cell tower (transceiver) will provide access to a different section of the movie. By predicting the route of the subscriber as he/she moves through the country, it is possible to pre-emptively cache different sections of the movie at the right cell towers. In this way, the subscriber would not have to experience an interruption to his/her network access, while a section of the movie is downloaded to the cell tower's cache.

Figure 1:
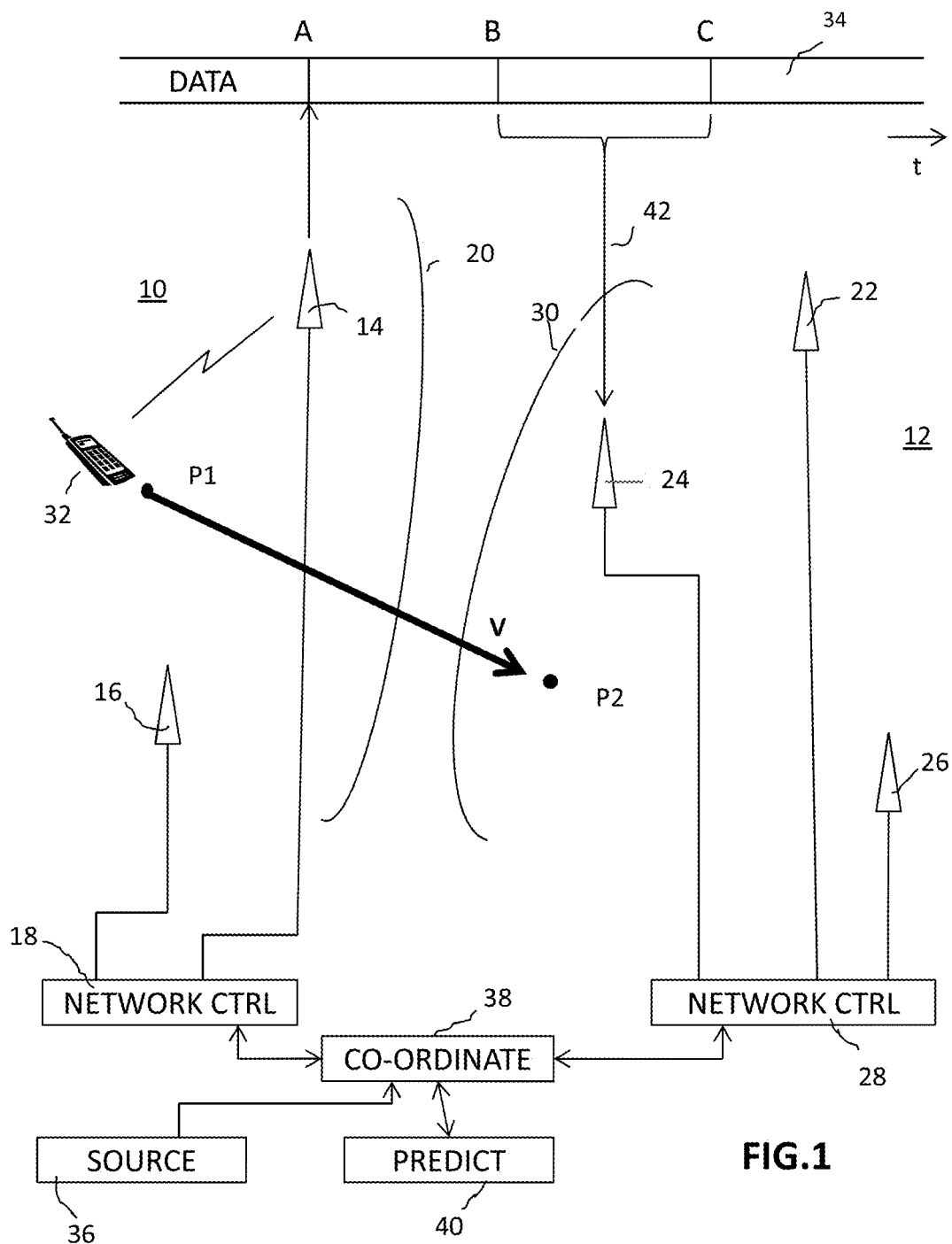
FIG. 1 is a schematic representation of a communications infrastructure arranged to pre-emptively download streamed data.

FIG. 1 schematically represents a pair of wireless networks 10, 12. The first network 10 includes two wireless transceivers 14, 16 linked via a first network control stage 18. The extent of coverage of the first network is represented by curved line 20. The second network 12 includes three wireless transceivers 22, 24, 26 linked via a second network control stage 28. The extent of coverage of the second network is represented by curved line 30. It will be readily appreciated that, although shown separately for reasons of clarity, in a practical implementation there will be a degree of overlap between the coverage areas of the two networks.

A mobile communications device 32 travels through the areas covered by the two networks and is configured to send messages to, and receive data from, any of the wireless transceivers, in particular to receive a continuous data stream 34 such as a movie supplied to the networks from a source 36. The data stream 34 is represented at the top of the Figure. At the instant shown, the mobile device 32 is at position P1 within the coverage area of the first network 10. Via transceiver 14, the mobile device is accessing the data stream 34 at a point A.

A download co-ordinator 38, coupled with the transceivers via the network control stages 18, 28, is arranged to initiate pre-caching of a portion of the data stream 34 at a predicted next wireless transceiver, with a prediction generator 40 coupled to the download co-ordinator 38 being configured to determine a current location P1 and velocity (indicated by arrow V) for the mobile communications device 32 and, based thereon, generate a prediction for the next wireless transceiver to be accessed. These operations are described in greater detail below.

Figure 2:
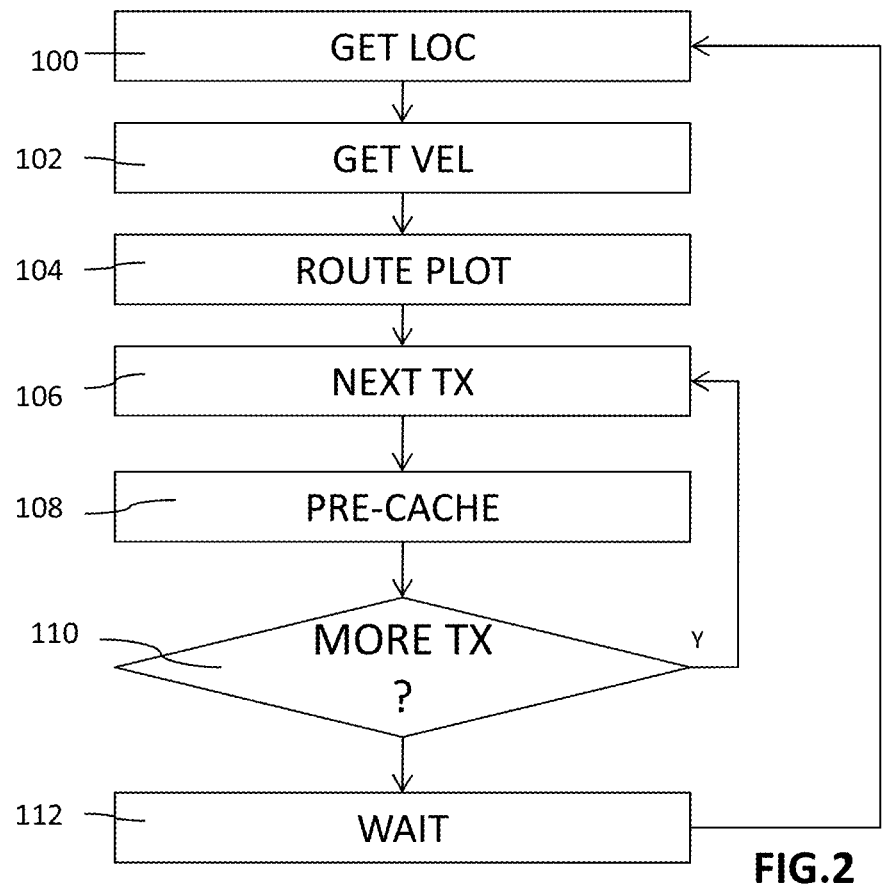
FIG. 2 is a flow chart representation of basic steps of a method embodying the present invention.

Referring additionally to FIG. 2, the method of operation commences at step 100 with identifying the current location P1 of the mobile communications device. There are numerous ways in which this might be accomplished including, for example, via GPS or triangulation from the cell towers (transceivers).

Next at step 102 the velocity (speed and direction) of the mobile communications device is determined. Again there are numerous ways to achieve this. For example, where the mobile communications device includes position detection means and/or motion sensors, the velocity information may be periodically pushed by the mobile device to the currently linked transceiver. Alternatively, the velocity may be determined from a timed sequence of position determinations, perhaps achieved through triangulation.

At step 104, based on the position and velocity data, a predicted route for the mobile communications device is plotted. In terms of FIG. 1, the predicted route indicates that the mobile communications device 32 will be at a position P2 within the coverage area of the second network 12 at a known future time.

At step 106, the predicted route is compared with the known locations of the transceivers, and the next transceiver that the mobile communications device will come into range of is identified (transceiver 24 in FIG. 1) and, at step 108, a portion of the data stream 34 between points B and C is pre-cached by downloading (represented by line 42) to storage at or closely connected to the identified transceiver. In this way, the portion of the data stream that the user of the mobile communications device is expected to be wishing to access at the time they are in range of the identified next transceiver 24 will be ready to access without undue delays that would otherwise arise as the transceiver requests the data from the source 36.

Figure 3:
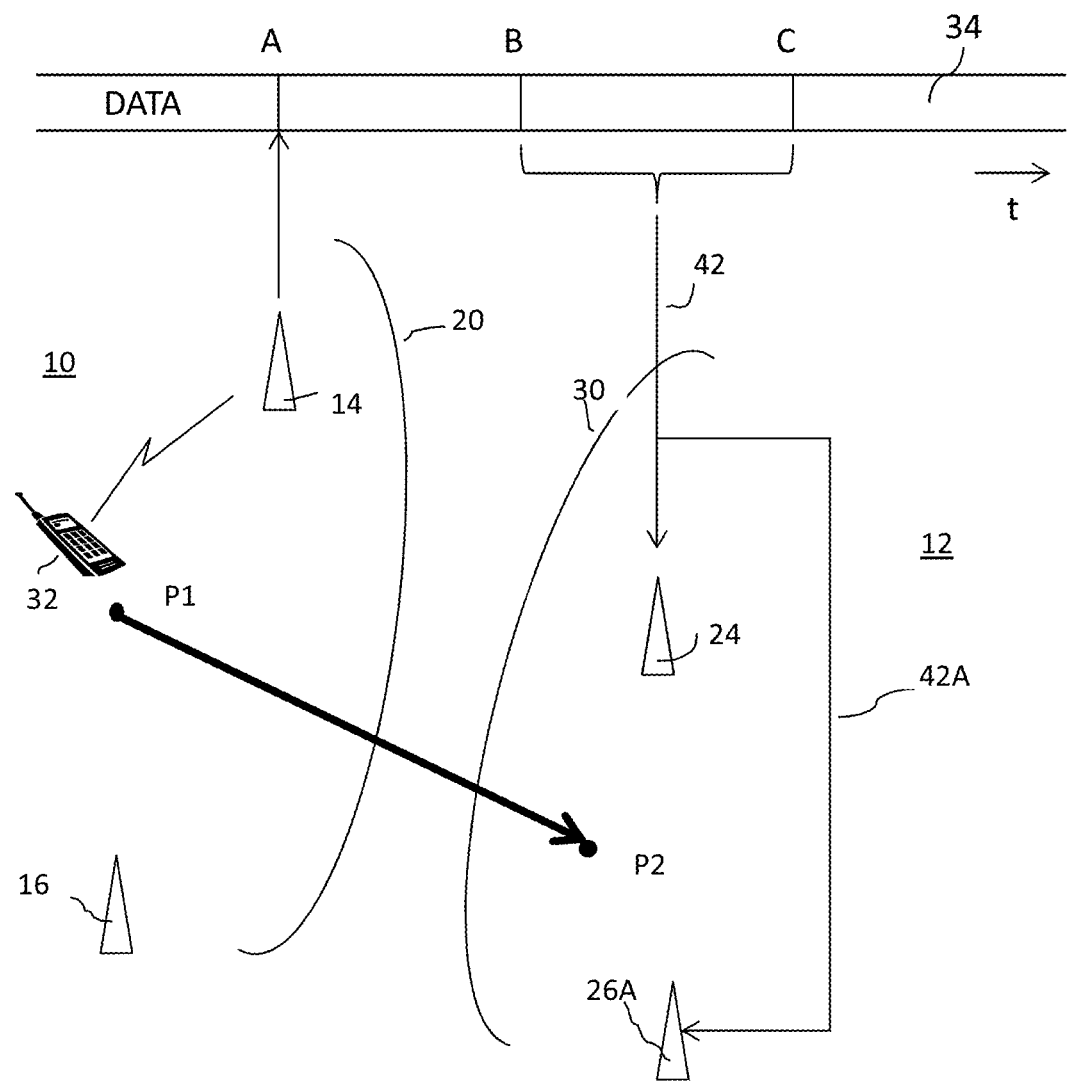
FIG. 3 is a modified version of a part of FIG. 1 illustrating an alternative arrangement embodying the present invention.

In an optional step 110, a check is made as to whether there are any further transceivers within range. As represented by FIG. 3, a level of tolerance may be included in the derivation of the position of future location P2 such that there are two (or maybe more) viable candidates 24, 26A for the next transceiver to be accessed. In such a case, the selected portion (B to C) of the data stream 34 is pre-cached at both, or all, of the identified transceivers, as represented by line 42A.

When the pre-caching has been completed, the process enters a short wait state at step 112 before returning to step 100 to obtain an updated location for the mobile communications device.

Figure 4:
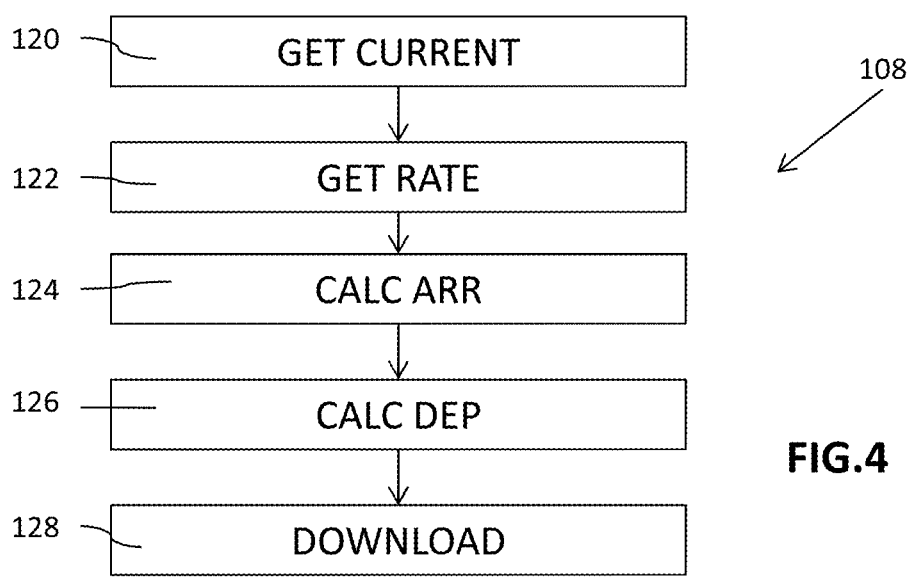
FIG. 4 is a flow chart representation of additional steps that may be incorporated within the method of FIG. 2.

FIG. 4 represents a number of further steps that may be performed within the pre-caching step 108 of FIG. 2. At step 120 a current access position within the data stream (point A, FIG. 1) is checked. If, for example, a user has paused the download of the data stream for a period then the previously predicted start and end points B, C of the section to be pre-cached will need to be adjusted accordingly. Similarly at step 122 a rate check is made to determine whether adjustment to points B and/or C is required. This may comprise a further check on the velocity of the mobile communications device: a sudden drop in speed (perhaps indicative of a traffic jam) would indicate a later than expected time of arrival at the next transceiver and the end point of portion B to C should be extended (if already pre-cached).

An alternative or additional rate check 122 would determine the rate at which the user is accessing the data stream. If the data stream is a section of AV content, for example the user is watching a movie on download, then there is an expected access rate. However, if the user alters that access rate—perhaps by repeatedly pausing, rewinding or fast-forwarding the stream—then a different average access rate arises, which different rate might then be used to determine where in the data stream the user is likely to be when encountering the next transceiver (point B).

An alternate or additional method for determining the extent of portion B to C is represented by steps 124 and 126 in which the expected arrival time at, and departure time from, a particular transceiver is derived from the position and velocity data to more precisely limit the extent of portion B to C.

When any or all of steps 120, 122, 124 and 126 are completed, the pre-caching step 108 concludes at 128 with the download of the selected portion B to C to the selected transceiver or transceivers.

Figure 5:
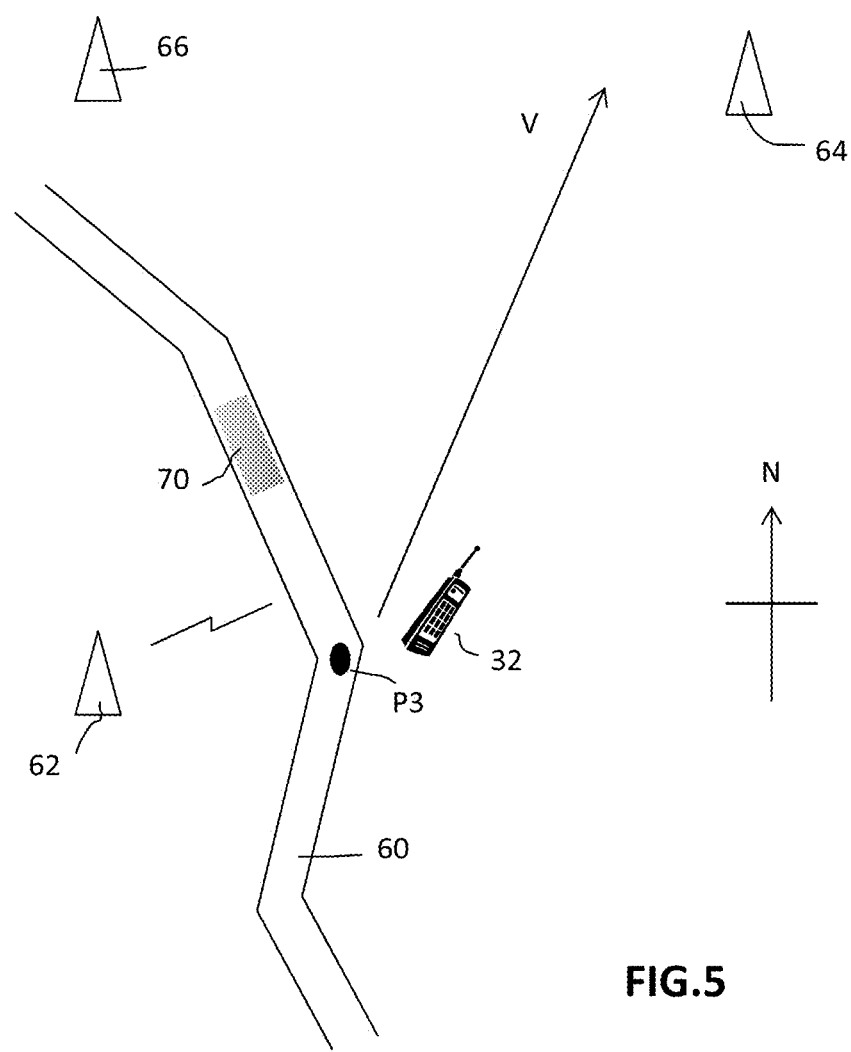
FIG. 5 schematically represents an operational condition that may be managed by an optional modification to the present invention.

A further contribution that may be taken into account in determining the next transceiver to be encountered is fore-knowledge of factors expected to affect the velocity of the mobile communications device 32. FIG. 5 represents a mobile communications device 32 travelling in a generally north-north-easterly direction along a road 60, accessing the data stream from a transceiver 62. At the instant shown, the mobile communications device is at a position P3 and has a velocity indicated by arrow V that indicates the next transceiver to be encountered is transceiver 64. However, fore-knowledge of the route that the road 60 takes (namely that it turns in a north-westerly direction after P3) may be incorporated in the route planning (step 104, FIG. 2) to correctly identify that transceiver 66 will be the next to be encountered, thereby avoiding the unnecessary pre-caching of data at transceiver 64. Such prediction based on known or expected non-linear travel routes is well established in the field of satellite navigation systems and need not be repeated here.

A further factor that may be expected to affect the velocity of the mobile communications device is known speed restrictions along the expected path of travel, such as a traffic jam as represented at 70 in FIG. 5. With modern traffic management systems, including satellite navigation systems, average speeds expected during the traversal of forthcoming stages of a journey are quite widely available, and this data may be incorporated in deriving the expected time to reach a next transceiver.

Figure 6:
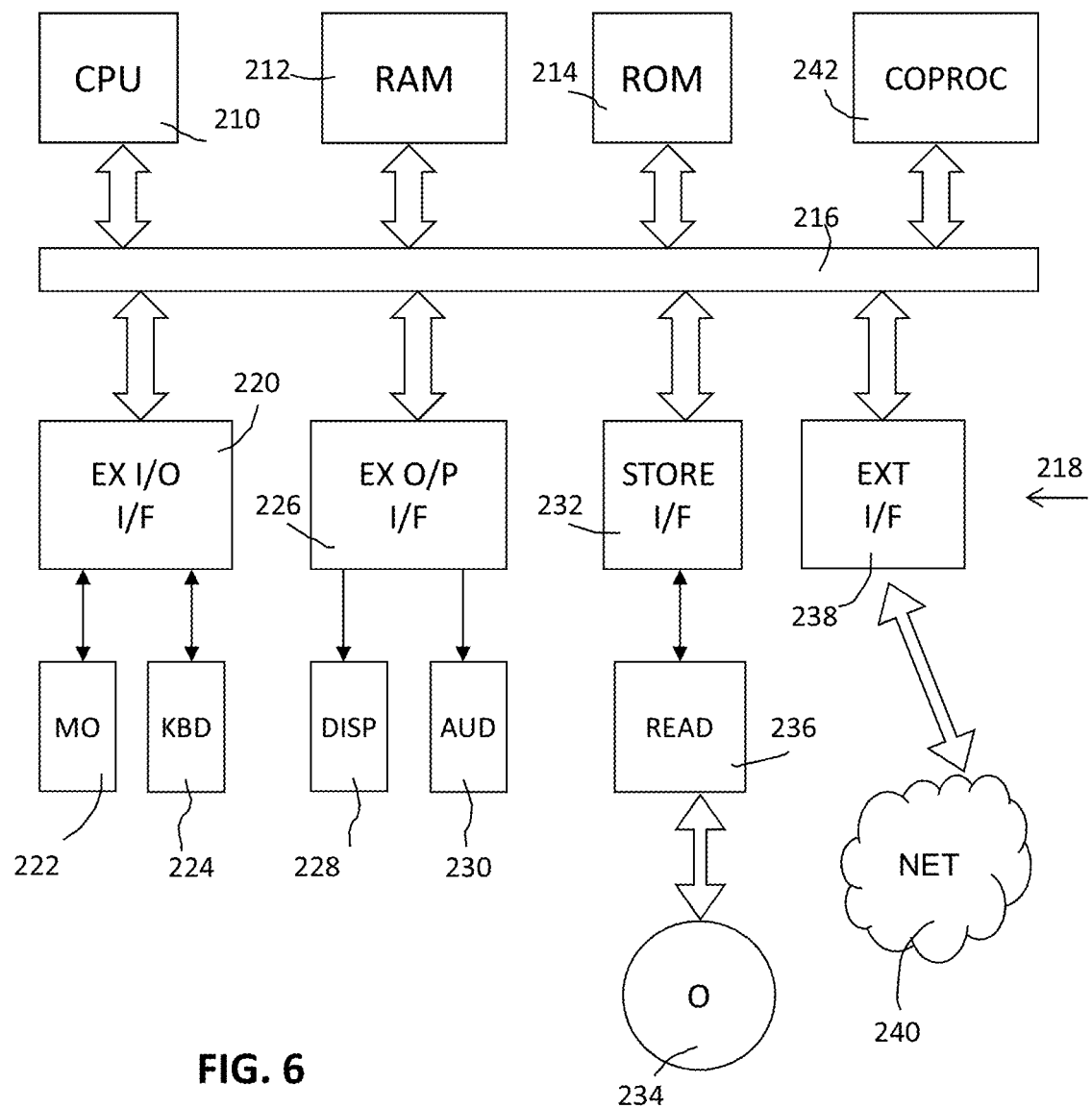
FIG. 6 is a block schematic diagram of components of a data processing apparatus suitable to implement aspects of the present invention.

FIG. 6 schematically represents the components of a computer system suitable to embody aspects of the present invention, particularly the download co-ordinator 38 and prediction generator 40 (and optionally also the network controllers 18, 28) in the arrangement of FIG. 1. A first processor CPU 210 is coupled with random access memory RAM 212 and read only memory ROM 214 by an address and data bus 216. As will be understood, CPU 210 may comprise a cluster of processors (nodes) with individual processes and/or process threads being handled by individual nodes. Also connected to CPU 210 via the address and data bus 216 is at least one further processor 242 (or cluster of nodes), which may be a further CPU sharing tasks with the first CPU 210, or may be a coprocessor device supplementing the function of the CPU 210, handling processes such as floating point arithmetic, graphics processing, signal processing and encryption. Each of these internal hardware devices 210, 212, 214, 242 includes a respective interface (not shown) supporting connection to the bus 216. These interfaces are conventional in form and need not be described in further detail.

Also connected to the CPU 210 via bus 216 are a number of external hardware device interface stages (generally denoted 218). A first interface stage 220 supports the connection of external input/output devices, such as a mouse 222 and/or keyboard 224. A second interface stage 226 supports the connection of external output devices such as a display screen 228 and/or audio output device 230, such as headphones or speakers. A third interface stage 232 supports the connection to external data storage devices in the form of computer readable media: such external storage may as shown be provided by a removable optical or magnetic disc 234 (accessed by a suitably configured disc reader 236). Alternatively or additionally the external storage may be in the form of a solid state memory device such as an extension drive or memory stick. The external storage may contain a computer program, containing program software code portions which, when run by the CPU 210 and/or further processor 242, perform the method according to the present invention.

A fourth interface stage 238 supports connection of the system to remote devices or systems (including the transceivers 14, 16, 22, 24, 26) via wired or wireless networks 240, for example over a local area network LAN, via the internet, or another cloud computing source. The network 240 may provide the connection to the source 36 for the data stream 34, or the data stream may be read from local storage such as RAM 212 or disc 234.

Under the control of software code portions, the CPU 210 performs the functions of the download co-ordinator 38 and prediction generator 40, based on data describing the motion of the mobile communications device received via interface 238 and stored data (suitably held in ROM 214) defining the locations of the transceivers.

In the foregoing, the applicants have described a method and apparatus for managing substantially continuous delivery of a data stream, such as streaming video, to a mobile communications device traversing a networked arrangement of wireless transceivers at known locations. Based on a current location and velocity for the mobile device, a predicted route is determined and used to identify the next wireless transceiver likely to be accessed. Based on the calculated time of arrival at the predicted next wireless transceiver, a portion of the data stream is identified and downloaded to the next transceiver such as to be immediately available when the mobile device comes within range.

In accordance with a first aspect of the present invention there is provided a method for managing substantially continuous delivery of a data stream to a mobile communications device through sequential access thereby to respective ones of a networked arrangement of wireless transceivers at known locations, comprising the steps of:
 determining a current location and velocity for the mobile communications device and, based thereon, generating a prediction for the next wireless transceiver to be accessed; and
 pre-caching a portion of the data stream at the predicted next wireless transceiver.

By causing the next transceiver to pre-cache the next portion of the data stream, delays and interruptions while the request for the stream is re-established are avoided. Additionally, by the identification of an individual transceiver, the need to pre-cache the same data at all transceivers of a network is avoided, reducing both network traffic and necessary storage capacity.

The portion of the data stream to be pre-cached may suitably be determined based on the current point in the data stream being accessed by the mobile communications device and a predicted access time at the next wireless transceiver. For example, if a user is currently 15 minutes into an item of streamed content (such as a film) and the current position and velocity data indicate that the next transceiver will be accessible in 10 minutes from the present time, the next transceiver may be set to start pre-caching the content from minute 25 onwards. In such a scenario, the determination of the portion of the data stream to be pre-cached may also take into account the rate at which the data stream is being accessed by the mobile communications device. For example, if a user is habitually pausing/rewinding the content or habitually skipping/fast-forwarding, then the start point from which pre-caching occurs may be retarded or advanced as appropriate.

The extent of the portion of the data stream to be pre-cached at a particular wireless transceiver may be determined at least partly by the time that the mobile communications device is predicted to be within communications range of that transceiver, based on the velocity of the mobile communications device, such as to avoid storage of unnecessary volumes of data. Additionally, or alternately, the extent of the portion of the data stream to be pre-cached at a particular wireless transceiver may be increased if the velocity of the mobile communications device decreases: this might be indicative of a traffic jam for example, suggesting that the user will require a later segment of the data stream to be pre-cached than originally calculated.

Where the step of generating a prediction for the next wireless transceiver to be accessed comprises a calculation including a predetermined error tolerance, it may be case that two or more potential next wireless transceivers are identified and, in such cases, each such potential next wireless transceiver would pre-cache the said portion of the data stream.

The step of generating a prediction for the next wireless transceiver to be accessed may suitably include consideration of ancillary data defining constraints on the location of the mobile communications device. For example, if previous location determinations for the mobile device indicate that it is travelling along a particular railway line or motorway, the known (or likely) route may be taken into account in the identification of the next transceiver. Such ancillary data may also include predicted changes to the determined velocity of the mobile communications device, perhaps linked to latest average speeds along a particular stretch of road.

Also in accordance with the present invention there is provided a communications apparatus comprising:
- a mobile communications device;
- a data source providing a sequential data stream;
- a plurality of network linked wireless transceivers coupled with the data source, each transceiver being at a known location, each being operable to transmit data to and receive data from the mobile communications device, and each having an associated data store operable to store data from said data source;
- a prediction generator configured to determine a current location and velocity for the mobile communications device and, based thereon, generate a prediction for the next wireless transceiver to be accessed; and
- a download co-ordinator coupled with the prediction generator and transceivers and arranged to initiate pre-caching of a portion of the data stream at the predicted next wireless transceiver.

The download co-ordinator which, together with the prediction generator, may be provided by a suitably programmed computer or data processor, may be arranged to control the portion of the data stream to be pre-cached based on the current point in the data stream being accessed by the mobile communications device and a predicted access time at the next wireless transceiver. It may further be configured to, during determination of the portion of the data stream to be pre-cached, also take into account the rate at which the data stream is being accessed by the mobile communications device.

In addition, the download co-ordinator may be arranged to determine the extent of the portion of the data stream to be pre-cached at a particular wireless transceiver at least partly on the basis of the time that the mobile communications device is predicted to be within communications range of that transceiver, based on the velocity of the mobile communications device. For example if a user is on a train, the time spent in each cell is relatively small, so only small sections are pushed to the next edge cache. If the user is walking (and their speed is low), it is likely that the user will require a much larger portion of the stream in the next cell area. Additionally or alternately, the download co-ordinator may be arranged to cause the extent of the portion of the data stream to be pre-cached at a particular wireless transceiver to be increased if the determined velocity of the mobile communications device decreases.

The present invention may be a system/apparatus, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Note that the summary of the present invention does not recite all the necessary features of the invention, and sub-combinations of those features may also encompass the invention.

While embodiments of the present invention have been described above, the technical scope of the invention is not limited to the scope of the above-described embodiments. It should be apparent to those skilled in the art that various changes or improvements can be made to the embodiments. It is apparent from the description of the appended claims that implementations including such changes or improvements are encompassed in the technical scope of the invention.

What is claimed is:

1. A method comprising:
    determining a current location and a current velocity of a mobile communications device;
    determining a rate at which a user of the mobile communications device is accessing a data stream that has been received from a current wireless transceiver at the current location, wherein the current wireless transceiver transmits the data stream to the mobile communications device at the current location;
    generating, based on a determined current location and the current velocity of the mobile communications device, a prediction for a next wireless transceiver to be accessed by the mobile communications device at a next location;
    pre-caching a portion of the data stream at the predicted next wireless transceiver, wherein the portion of the data stream to be pre-cached is at least partially based on the rate at which the data stream is being accessed by the user of the mobile communications device at the current location;
    determining that the mobile communications device has moved to the next location;
    responsive to the determination that the mobile communications device has moved to the next location, streaming the pre-cached portion of the data stream from the predicted next wireless transceiver to the mobile communications device;
    detecting, by one or more processors, repeated user disruptions of a playback of the data stream; and
    adjusting, by the one or more processors, the pre-caching of the portion of the data stream at the predicted next wireless transceiver based on the repeated user disruptions of the playback of the data stream.

2. The method as claimed in claim 1, wherein the portion of the data stream to be pre-cached is determined based on a current point in the data stream being accessed by the user of the mobile communications device and a predicted access time at the predicted next wireless transceiver.

3. The method as claimed in claim 1, further comprising:
    adjusting, by the one or more processors, the portion of the data stream to be pre-cached at the predicted next wireless transceiver based on detecting the user of the mobile communications device repeatedly pausing the data stream at the current location, wherein detecting said repeatedly pausing causes a smaller portion of the data stream to be pre-cached at the predicted next wireless transceiver.

4. The method as claimed in claim 1, further comprising:
    determining, by the one or more processors, the portion of the data stream to be pre-cached at the predicted next wireless transceiver according to a time that the mobile communications device is predicted to be within communications range of the predicted next wireless transceiver, wherein the time is based on the current velocity of the mobile communications device.

5. The method as claimed in claim 1, wherein an extent of the portion of the data stream to be pre-cached at the predicted next wireless transceiver is increased in response to the current velocity of the mobile communications device decreasing, wherein the extent describes a data position of data in the data stream, and wherein increasing the extent causes additional data, after said portion of the data stream in the data stream, to also be pre-cached at the predicted next wireless transceiver.

6. The method as claimed in claim 1, wherein said generating the prediction for the next wireless transceiver to be accessed comprises a calculation including a predetermined error tolerance such that two or more potential next wireless transceivers are identified, and wherein each of the two or more potential next wireless transceivers pre-caches said portion of the data stream.

7. The method as claimed in claim 1, wherein the data stream is a video file for a video, and wherein the method further comprises:
    determining, by the one or more processors, a current position in the video file at which the video is being viewed on the mobile communications device;

predicting, by the one or more processors, a predicted travel time for the mobile communication device to reach a broadcast range of the predicted next wireless transceiver;

identifying, by the one or more processors, a starting position in the video file at which the video file will be streamed by the predicted next wireless transceiver, wherein the starting position in the video file is based on the current position in the video file and the predicted travel time.

8. The method as claimed in claim 1, wherein said generating the prediction for the next wireless transceiver to be accessed includes accommodating ancillary data defining constraints on the current location of the mobile communications device, and wherein the ancillary data includes predicted changes to the current velocity of the mobile communications device.

9. The method as claimed in claim 1, further comprising:
adjusting, by the one or more processors, the portion of the data stream to be pre-cached at the predicted next wireless transceiver based on detecting the user of the mobile communications device rewinding the data stream at the current location, wherein said rewinding causes a smaller portion of the data stream to be pre-cached at the predicted next wireless transceiver.

10. The method as claimed in claim 1, wherein the data stream is a video file, and wherein the method further comprises:
determining, by the one or more processors, a starting time point and an ending time point on the video file that define a portion of the video file to be streamed to the mobile communications device during a time period in which the mobile communications device is predicted to be within communication range of the predicted next wireless transceiver;
determining, by the one or more processors, a history of a playback direction at which the video file has been adjusted by the user of the mobile communications device while in the current location; and
adjusting, by the one or more processors, the starting time point and the ending time point on the video file for pre-caching in the predicted next wireless transceiver based on the history of the playback direction at which the video file has been adjusted by the user of the mobile communications device.

11. The method as claimed in claim 1, further comprising:
predicting, by the one or more processors, a predicted route for the mobile communications device to travel from the current location to the next location; and
adjusting, by the one or more processors, a time at which the mobile communications device will have moved to the next location based on the predicted route.

12. The method as claimed in claim 1, wherein the data stream is a video file, and wherein the method further comprises:
determining, by the one or more processors, a starting time point and an ending time point on the video file that define a portion of the video file to be streamed to the mobile communications device during a time period in which the mobile communications device is predicted to be within communication range of the predicted next wireless transceiver;
determining, by the one or more processors, a history of playback speed at which the video file has been viewed by the user of the mobile communications device; and
adjusting, by the one or more processors, the starting time point and the ending time point on the video file based on the history of playback speed at which the video file has been viewed by the user of the mobile communications device.

13. The method of claim 1, wherein the mobile communications device is being transported on a vehicle that is traveling on a roadway while at the current location, and wherein the method further comprises:
identifying, by the one or more processors, a historical average vehicular speed on the roadway on which the vehicle is traveling while at the current location; and
modifying, by the one or more processors, a prediction for when the next wireless transceiver will be accessed by the mobile communications device based on traffic congestion on the roadway on which the vehicle is traveling while at the current location.

14. The method of claim 1, wherein the mobile communications device is being transported on a vehicle that is traveling on a roadway while at the current location, and wherein the method further comprises:
identifying, by the one or more processors, traffic congestion on the roadway on which the vehicle is traveling while at the current location; and
modifying, by the one or more processors, a prediction for when the next wireless transceiver will be accessed by the mobile communications device based on the traffic congestion on the roadway on which the vehicle is traveling while at the current location.

15. The method of claim 1, wherein the mobile communications device is being transported on a vehicle that is traveling on a roadway while at the current location, and wherein the method further comprises:
identifying, by the one or more processors, a shape of the roadway on which the vehicle is traveling while at the current location; and
modifying, by the one or more processors, a prediction for when the next wireless transceiver will be accessed by the mobile communications device based on the shape of the roadway on which the vehicle is traveling while at the current location.

16. A communications apparatus comprising:
a mobile communications device;
a data source providing a sequential data stream;
a plurality of network linked wireless transceivers coupled with the data source, each transceiver being at a known location, each transceiver being operable to transmit data to and receive data from the mobile communications device, and each transceiver having an associated data store operable to store data from said data source;
a prediction generator configured to determine a current location and a current velocity of the mobile communications device and, based thereon, generate a prediction for a next wireless transceiver to be accessed by the mobile communications device at a next location;
a download co-ordinator coupled with the prediction generator and transceivers and arranged to;
initiate pre-caching of a portion of the data stream at the predicted next wireless transceiver, wherein the portion of the data stream to be pre-cached is at least partially based on a rate at which the data stream is being accessed by a user of the mobile communications device at the current location;
determine that the mobile communications device has moved to the next location;
responsive to determining that the mobile communications device has moved to the next location, stream the pre-cached portion of the data stream from the predicted next wireless transceiver to the mobile communications device;

detect repeated user disruptions of a playback of the data stream; and adjust the pre-caching of the portion of the data stream at the predicted next wireless transceiver based on the repeated user disruptions of the playback of the data stream.

17. The communications apparatus as claimed in claim 16, wherein the download co-ordinator is arranged to cause an extent of the portion of the data stream to be pre-cached at a particular wireless transceiver to be increased in response to the current velocity of the mobile communications device decreasing, wherein the extent describes a data position of data in the data stream, and wherein increasing the extent causes data, after said portion of the data stream in the data stream, to be pre-cached at the predicted next wireless transceiver.

18. A computer program product for managing substantially continuous delivery of a data stream to a mobile communications device through sequential access thereby to respective receivers from a networked arrangement of wireless transceivers at known locations, the computer program product comprising a non-transitory computer readable storage medium having program code embodied therewith, the program code readable and executable by a processor to perform a method comprising:

determining a current location and a current velocity of the mobile communications device;

determining a rate at which a user of the mobile communications device is accessing a data stream from a current wireless transceiver at the current location;

generating, based on the current location and the current velocity of the mobile communications device, a prediction for a next wireless transceiver to be accessed by the mobile communications device at a next location;

predicting, based on the current location and the current velocity of the mobile communications device, a time at which the mobile communications device will be within range of the next wireless transceiver at the next location;

predicting a start point and an end point for a portion of the data stream to be pre-cached at the predicted next wireless transceiver based on the predicted time at which the mobile communications device will be in range of the next wireless transceiver at the next location, wherein the start point and the end point define the portion of the data stream to be pre-cached at the predicted next wireless transceiver;

pre-caching the portion of the data stream at a predicted next wireless transceiver, wherein the portion of the data stream to be pre-cached is based on the predicted time at which the mobile communications device will be in range of the next wireless transceiver at the next location and the rate at which the data stream is being accessed by the user of the mobile communications device;

determining that the mobile communications device has moved to the next location;

responsive to the determination that the mobile communications device has moved to the next location, streaming the pre-cached portion of the data stream from the predicted next wireless transceiver to the mobile communications device;

determining a starting time point and an ending time point on the video file that define a portion of the video file to be streamed to the mobile communications device during a time period in which the mobile communications device is predicted to be within communication range of the predicted next wireless transceiver;

determining a history of a playback direction at which the video file has been adjusted by the user of the mobile communications device while in the current location; and adjusting the starting time point and the ending time point on the video file for pre-caching in the predicted next wireless transceiver based on the history of the playback direction at which the video file has been adjusted by the user of the mobile communications device.

* * * * *